United States Patent [19]

Wimmer

[11] 4,219,767
[45] Aug. 26, 1980

[54] SYSTEM AND METHOD OF MINIMIZING VELOCITY FLUCTUATIONS IN A SYNCHRONOUS MOTOR SHAFT

[75] Inventor: Guenther W. Wimmer, Portland, Oreg.

[73] Assignee: Tektronix, Inc., Beaverton, Oreg.

[21] Appl. No.: 25,220

[22] Filed: Mar. 29, 1979

[51] Int. Cl.² .............................................. G05B 19/40
[52] U.S. Cl. .................................. 318/696; 318/702; 318/307; 318/611
[58] Field of Search ............... 318/696, 685, 702, 307, 318/611, 619

[56] References Cited

U.S. PATENT DOCUMENTS

| 3,970,942 | 7/1976 | Mayer | 318/702 |
| 4,115,726 | 9/1978 | Patterson et al. | 318/702 |
| 4,119,901 | 10/1978 | Leenhouts | 318/696 |
| 4,143,311 | 3/1979 | Lee | 318/702 |

Primary Examiner—J. V. Truhe
Assistant Examiner—Eugene S. Indyk
Attorney, Agent, or Firm—Thomas J. Spence

[57] ABSTRACT

A system for controlling the amplitude of a drive signal applied to a stepping motor in a manner minimizing the effects of resonance on the resultant angular velocity of the motor shaft. Means are provided for comparing a desired motor drive frequency against one or more known resonant frequencies and, responsive to such comparison, for producing a motor drive signal at an amplitude predetermined to minimize oscillatory fluctuations in the motor shaft velocity.

14 Claims, 4 Drawing Figures

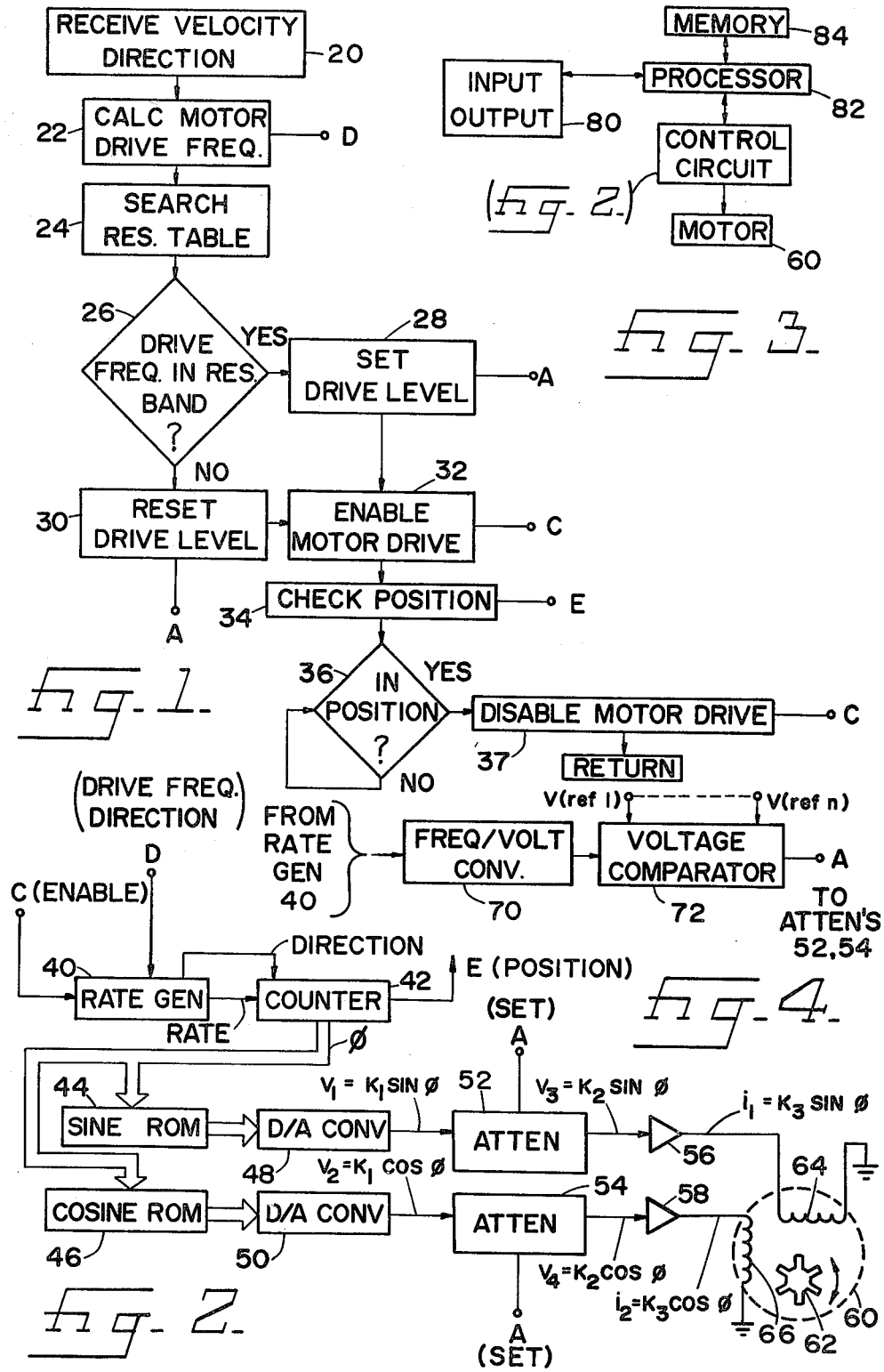

SYSTEM AND METHOD OF MINIMIZING VELOCITY FLUCTUATIONS IN A SYNCHRONOUS MOTOR SHAFT

BACKGROUND OF THE INVENTION

The subject matter of the present invention pertains to means for minimizing fluctations in the angular velocity of a syncronous motor shaft, and in particular the shaft of a step or stepping motor. Simply stated, a stepping motor is a synchronous motor whose output shaft rotates in incremental response to a series of changes in an input drive signal. When properly controlled, the output increments or steps are always equal in number to the number of input signal changes. For a basic understanding of the theory and operation of such motors, see, for example, Benjamin C. Kuo, "Theory and Applications of Step Motors," West Publishing Co., St. Paul, 1974, all pertinent parts of which are incorporated herein by this reference.

As is known to the art, stepping motors have been employed for some time in a wide range of control applications. More recently, they have found use in practially all types of computer peripheral equipment, such as printers, tape drives, memory access mehanisms, and incremental plotters. Being inherently discrete-motion devices, stepping motors are compatible with digital control techniques and any positional error introduced during their operation is noncumulative. Moreover, it is possible to achieve accurate position and speed control in an open-loop environment. When operating in such an environment, a stepping motor may experience three major modes of operation; discrete incremental motion (stepping), continuous unidirectional motion (slewing), and, between stepping and slewing, transitional. In the stepping mode, the rotor element of the motor comes to rest between each incremental movement, in the slewing mode, it does not, and the motor behaves very similar to a synchronous motor. In the transitional mode, shaft motion is somewhat erratic and unpredictable.

A common problem with stepping motors operating in the slewing mode is the tendency of their rotating shafts to turn with a fluctuating angular velocity, a phenomenon similar to the hunting characteristics of a synchronous motor. Such fluctuations are oscillatory in nature and tend to occur whenever the frequency of the motor drive or excitation current is equal to or a harmonic of a natural or resonant frequency of the spring/mass equivalent of the motor and its associated load. The amplitude of the velocity fluctuations is a function of both the amplitude and the frequency of the drive current supplied to the motor.

If not corrected or reduced to an insignificant level, the fluctuations in angular shaft velocity will introduce intolerable nonlinearities into the operation of the particular piece of equipment being controlled by the motor. Such correction or reduction is especially important in the field of incremental plotters where such nonlinearities severely limit the ability of the device to produce high-resolution graphics.

Known methods for controlling oscillations in a stepping motor system are directed generally to the damping of oscillations during the incremental or stepping mode of operation as opposed to the continuous motion or slewing mode. A number of such methods are outlined in the Kuo reference cited above and include the use of mechanical inertia dampers, the use of electronics switching schemes markedly dissimilar from that of the present invention, and the modification of physical and electrical motor parameters. Other means and methods for controlling the operation of stepping motors are disclosed in Cannon U.S. Pat. Nos. 4,126,821, Schaff 4,104,574, Pritchard 4,087,732, and Leenouts 3,908,195.

SUMMARY OF THE INVENTION

The present invention is directed to a system and method for minimizing fluctuations in the angular velocity of a synchronous motor shaft, specifically the shaft of a permanent-magnetic-rotor or synchronous-inductor type stepping motor operating in the slewing or continuous-forward-motion mode. More particularly, the system of the present invention comprises means for comparing a signal representing a desired motor drive frequency with one or more signals representing previously derived resonant frequencies of a particular stepping motor and associated load to be controlled, and means responsive to such comparison for selecting an amplitude of drive current for application to the motor in a manner known to minimize the tendency of the motor shaft to turn with a fluctuating angular velocity. Embodiments are disclosed for processing the desired and resonant signals in either digital or analog form.

As is known to the art, the angular shaft velocity of a stepping motor operating in the slewing mode tends to fluctuate resonately about the frequency of the drive current applied to the motor, the amplitude of the fluctuation being a function of the amplitude and frequency of the drive current. At certain drive frequencies, lowering the drive current amplitude lowers the velocity fluctuations, while at certain other drive frequencies, raising the drive current amplitude also lowers the fluctuations. It is therefore possible to control the amplitude of the velocity fluctuations by selecting the amplitude of the drive current in a predetermined manner.

The system of the present invention includes means capable of performing certain predefined compare operations, means for storing a quantity of information upon which such operations may be performed, and a control circuit for supplying, in response to each compare operation, an incrementally variable drive signal at a preselected amplitude.

Before operation of the system, the various drive frequencies and drive current amplitudes at which the angular shaft velocity of a particular stepping motor and associated load fluctuates resonately with an amplitude greater than a predefined maximum are first determined by any of several known means, for example by observing the shaft velocity via a tachometer and a frequency spectrum analyzer or, in the case of an incremental plotter, by observing the aberrations in a series of straight lines drawn by the plotter. Signals representing the resonant frequencies thus obtained, or signals representing the upper and lower limits of a band of frequencies surrounding such resonant frequencies, are stored in the system storage means.

During operation, the system receives from an external source a signal representative of a drive frequency at which the motor is desired to be operated. Upon receipt, each drive frequency signal is compared with the stored plurality of signals representing the previously determined resonant frequencies or frequency limits. If no match is found between the received drive frequency signal and the stored resonant frequency signals, the motor control circuit is enabled to energize the motor at maximum current. However, if a match is found, the control circuit is enabled to actuate the motor at an attenuated level of drive current where shaft velocity fluctuations are known to be minimal. The comparing, attenuating if necessary, and enabling operations are performed each time a new drive frequency signal is received so as to permit the automatic and dynamic control of the operation of the stepping motor in a manner minimizing the effects of resonance on its output shaft velocity.

It is, therefore, a principal objective of the present invention to provide a system for automatically and dynamically minimizing fluctuations in the angular shaft velocity of a stepping motor operating in the slewing mode.

It is an additional primary objective of the present invention to provide a method for minimizing such fluctuations.

It is an advantage of the system of the present invention that the need for mechanical dampers is obviated, thereby saving the cost of such dampers and the power lost while driving such dampers, the power saved being available to drive the load.

It is a feature of the present invention that signals representative of desired stepping-motor drive frequencies are compared against a plurality of signals representative of previously derived resonant frequencies in a manner permitting automatic and dynamic adjustment of the amplitude of a motor drive signal in a direction minimizing the effect of operation at such resonant frequencies.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a flow chart of the motor control scheme forming a part of the motor control system of the present invention.

FIG. 2 is a block diagram of the motor control circuit forming a part of the motor control system of the present invention.

FIG. 3 is a conceptual diagram of an exemplary embodiment of the motor control system of the present invention.

FIG. 4 is a block diagram of an exemplary circuit embodiment of a part of the scheme of FIG. 1.

DESCRIPTION OF THE PREFERRED EMBODIMENT

Referring to FIGS. 1 and 2, there is shown in flowchart and block-diagram form, respectively, a scheme (FIG. 1) for controlling the operation of a circuit (FIG. 2) for driving a stepping motor. The scheme of FIG. 1 includes, briefly, the steps of: receiving 20 a digital signal representative of a desired velocity and direction of an apparatus controlled by a particular stepping motor; calculating 22 from the velocity signal a motor drive frequency; searching 24 a stored table of previously defined resonant drive frequencies; depending on the results 26 of the search, producing 28, 30 a signal indicative of a desired drive signal amplitude; and enabling 32 the motor drive circuit (FIG. 2) to drive the stepping motor in the desired direction, at the desired drive frequency, and with the desired level of drive signal. Provision is also made for monitoring 34 the operation of the drive circuit to detect 36 when the motor shaft has turned a desired number of partial or complete revolutions. The letters A, C, D, E in FIG. 1 indicate data and control signal paths connected to correspondingly lettered terminals in the circuit of FIG. 2. A more detailed description of the operation of the scheme of FIG. 1 is given below.

Turning now to FIG. 2, the drive circuit of the present invention is seen to include: a programmable rate generator 40 for selectively producing a steady stream of digital signal pulses at a rate corresponding to the earlier-calculated drive frequency and a sign signal corresponding to the earlier-received desired apparatus direction; a digital counter module 42 for incrementing a stored variable at a rate and in a direction determined by the signals produced by the rate generator 40; a sine module 44 and cosine module 46 for selectively producing digital signals representative of the sine and cosine of each value of the variable stored in the counter module 42; two digital-to-analog (D/A) convertor modules 48, 50 for converting, respectively, the digital signals produced by the sine and cosine modules 46, 48 into analog voltage signals representative of such digital signals; two programmable voltage attentuators 52, 54 for selectively introducing a predetermined amount of attenuation into the signals produced by the D/A convertors 48, 50; two current-mode amplifiers 56, 58 for producing an analog current signal with a magnitude proportional to that of the selectively attentuated voltage signal of the D/A convertors 48, 50; and a stepping motor 60 having a rotor element 62 movable to and maintainable at an angular position uniquely defined by the sine and cosine current signals of the amplifiers 56, 58. As will be apparent to those persons familiar with the art, the individual components of the circuit of FIG. 2 are conventional in nature, and it is their combination and functional interrelationships, together with their operational control by the scheme of FIG. 1, that form the basis of the motor control system of the present invention.

It is central to the effective operation of the system of the present invention formed by the scheme of FIG. 1 and the circuit of FIG. 2 that an initial analysis be made of the stepping motor 60 and any associated load to determine the slew-mode drive frequencies at which the angular velocity of the rotor element 62 tends to fluctuate significantly. Such an analysis may be accomplished by any of several methods such as, for example, conducting a frequency-spectrum analysis of an output signal produced by a tachometer attached to the rotor element during slew mode operation of the motor and load. A second method, specifically adaptable to a plotter mechanism employing stepping motors as the X and Y drive means, is to cause the writing element of the plotter to draw straight lines from a common point at angles varying from 0° to 90°, observe the lines that evidence nonlinear operation, and calculate the motor drive frequencies from the known writing element speed and interconnecting gear ratios. An angle range of 0° to 90° is chosen because it will cause each motor to operate through its entire speed range from zero to a preselected maximum. If other than reciprocal nonlinearity is suspected, that is, if reverse operation of the motors and associated loads are anticipated to produce nonlinearities different from forward operation, a similar series of lines can be drawn from other points and at other angles, and the observation and calculation steps repeated. Because of inherent nonlinearities in any motor-driven system, such tests performed on a particular mechanism will usually uncover several ranges of drive frequencies that produce undesirable oscillatory operation.

As mentioned in an early section of this specification, it has been determined that the resonant-frequency characteristics of a particular stepping motor and associated load will change as the amplitude of the drive current changes. This follows from the analogy between a stepping motor and load and a mechanical spring/mass combination. (When used herein, the term "drive current" or "drive signal" is meant to include the total signal applied to the motor 60, for example, both phases of a two-phase signal, the term "amplitude" is meant to indicate the maximum value of an alternating signal, and the term "magnitude" is meant to indicate an instantaneous or steady-state value of such a signal.) A stepping motor at rest under the influence of a particular combination of steady state drive currents will evidence a resistance to movement of its rotor element that is proportional to the respective magnitudes of the drive currents. As the drive current magnitudes are increased or decreased, the movement-resisting force will also increase or decrease. Such a relationship between drive current magnitudes and movement resistance is directly analogous to the relationship between the spring constant of a mechanical spring and the resistance of the spring to extension or compression. Thus, with drive current magnitude being analogous to mechanical spring constant, it is seen that varying the magnitude of the drive current will vary the resonant frequency characteristics of the spring/mass system represented by the motor and associated load. Accordingly, repeating the above-described test of a plotter mechanism at different amplitudes of drive current will usually uncover different ranges of resonating drive frequencies. By judicious selection of drive current amplitudes, it is possible to derive a series of drive current amplitude/frequency combinations that effectively eliminate all undesireable nonlinearity from the system. In a particular plotter mechanism subjected to such analysis it was possible to determine two drive current amplitudes, differing by a factor of three, the alternate selection of which produced acceptably straight lines throughout the entire range of motor drive speeds.

In the discussion that follows, it is assumed that only two drive current amplitudes are necessary to produce acceptable system operation, that is, oscillatory operation at a first drive current amplitude is reduced to an acceptable limit by switching to a second amplitude and vice versa. Thus, only the resonant frequency ranges associated with a first drive current amplitude need be stored in the system and only two levels of drive current amplitude need be selectable. It is understood that the system discussed may be expanded to store resonant frequency ranges associated with more than two amplitudes of drive current and to select more than two drive current amplitudes without departing from the invention as disclosed.

Consider now the operation of the system formed by the operative combination of the control scheme of FIG. 1 and the circuit of FIG. 2. Such a system is shown conceptually in FIG. 3 as including input/output means 80 for processing input and output data and control signals, processor means 82 and memory means 84 for performing the scheme of FIG. 1, the control circuit of FIG. 2 and the stepping motor 60. The scheme of FIG. 1 may be a software program executable by a general purpose processor 82 and memory 84 or the processor and memory may be of a special purpose nature with the scheme of FIG. 1 embedded in its hardware. As is discussed further below, a major part of the scheme of FIG. 1 may also be performed by special purpose analog circuitry. To initiate operation, a digital signal representative of the desired velocity and direction of an apparatus controlled by the rotor element 62 of the stepping motor 60 is received 20 by the processor means 82 and employed to calculate 22 a signal representative of a desired motor drive frequency and direction. This signal is applied via data path D to the programmable rate generator 40 to produce the rate and direction signals controlling the counter module 42. Before the rate generator is enabled, however, a search 42 is made of the resonant frequencies previously derived and stored in the memory means 84, for example, by comparing the signal representative of the desired drive frequency with each stored frequency signal or by making the comparison with stored frequency signals representative of upper and lower limits of a band of frequencies, to determine 26 whether the desired drive frequency is likely to produce oscillatory fluctuations in the resultant angular velocity of the rotor element 62 when the motor 60 is driven with a predetermined maximum amplitude of drive current. If a match is found between the desired drive frequency and a previously stored resonant frequency, a SET signal is generated 28 and applied via control path A to the programmable attentuators, 52, 54 to cause the amplitudes of the respective drive currents to be attenuated by a predetermined amount, for example one third, at which level operation of the motor 60 will be without significant velocity fluctuations. If no match is found, no attenuation signal is generated and any previously generated attenuation signal is cleared 30, also via control path A, thereby permitting operation of the motor at maximum drive current amplitude. The rate generator 40 is then enabled 32 by a signal applied via control path C.

During operation of the circuit of FIG. 2, the value stored in the counter module 42 is incremented at a rate and in a direction dictated by the signals produced by the rate generator 40. The value stored in the counter module 42 may be initialized by any suitable conventional means, not shown, to correspond to a desired orientation of the rotor element 62. The output of the counter module 42, for example a 7-bit digital signal $\phi$, is applied simultaneously to both the sine module 44 and the cosine module 46, each of which are preferably a conventional random-access read-only memory (ROM) module capable of producing a unique 8-bit sine or cosine signal for each value of the 7-bit data input signal. It is understood that the number of bits in the output signals of the counter module 42 and ROM's 44, 46 is a design choice and that modules producing signals with greater or lessor bit resolution may be employed as well.

The 8-bit signals of the sine and cosine modules 44, 46 are applied respectively to a pair of D/A convertors 48, 50 for conversion in a conventional manner into analog voltage signals the magnitudes and senses of which correspond to the magnitudes and signs of the particular input function ($v_1 = k_1 \sin \phi$, $v_2 = k_1 \cos \phi$). The voltage signals $v_1$, $v_2$ are applied in turn to respective programmable attenuators 52, 54 for attenuation if a match was found earlier between the desired motor drive frequency and a stored resonant frequency, or passthrough without attenuation if no match was found. As indicated earlier, a preferred attenuation is one third so the output signals from the attenuators 52, 54 are $v_3 = k_2 \sin \phi$, $v_4 = k_2 \cos \phi$, respectively, where $k_2 = k_1/3$ for an earlier mentioned frequency match and $k_2 = k_1$ for no match. It is understood that the attenuation factor is a design choice and may vary depending upon the characteristics of the particular system under consideration.

Lastly, the voltage signals $v_3$, $v_4$ of the attenuators 52, 54 are applied, again respectively, to a pair of current-mode amplifiers 56, 58 for conversion into current signals $i_1 = k_3 \sin \phi$, $i_2 = k_3 \cos \phi$, where $k_3 = k_2 (i_1/v_3) = k_2(i_2/v_4)$, for application to the drive coils 64, 66 of the motor 60. Thus, the drive currents applied to the motor 60 at any instant of time are directly proportional to the sine and cosine functions of the value stored in the counter module 42, a value that changes at a rate proportional to that of the programmable rate generator 40. Since the rotor element 62 of the motor 60 is movable to and stoppable at any angular position uniquely defined by the relative amplitudes of the two drive currents, any sequential change in the value stored in the counter module 42 causes a corresponding sequential movement of the rotor element, with a discrete change causing discrete movement and a continuous change causing continuous movement, and with the rate and direction of movement being determined by the rate and direction of change.

In a particular system of the present invention that has been reduced to practice, a 1.8° stepping motor requiring 50 cycles of an alternating motor drive signal for one complete revolution of its rotor element 62 was used. Normally, a drive frequency of 50 Hz will drive such a motor at 1 revolution per second (RPS); however, as the control circuit of FIG. 2 effectively divides each cycle of the sine and cosine drive signals into $2^7$ or 128 parts, a drive frequency of 6400 Hz is necessary to drive the motor at 1 RPS. The benefit of such drive cycle division is finer control of rotor movement and the ability to stop the rotor at any of 6400 different positions. It is understood that for comparison purposes all frequencies must be normalized to the same point in the system.

To monitor the movement of the rotor element 62, the low-order bit of the counter module 42 is sampled 34 by the scheme of FIG. 1 via the data path E until the value stored in the counter has been incremented a desired number of units. For less resolution, higher order bits of the counter module may be sampled. Once the rotor element has rotated the desired number 36 of partial or complete revolutions, the rate generator 40 is disabled 37 and the process repeated 38 as desired.

Assumed in the rate generator 40 are conventional means for controlling the pulse rate during the initial period of each enablement in a manner permitting the rotor element 62 of the motor to maintain synchronism while accelerating from rest. Such control may take, for example, the form of an exponentially decaying pulse interval on the order of: pulse interval $= PI_s + PI_i$ (e to the $-t/T$), where $PI_s$ is the steady-state pulse interval, $PI_i$ is a delay factor less than $PI_s$, and T is a time constant at which the pulse interval will decay from $PI_s + PI_i$ to $PI_s$. Similar control is effected during deceleration. Such means, because of their conventional nature, may be assumed for completeness of disclosure.

As was indicated earlier, a major part of the scheme of FIG. 1 may be performed by special purpose analog circuitry operating on analog signals representative of the previously described desired and resonant drive frequencies. Such circuitry is shown in FIG. 4 to comprise, for example, a frequency-to-voltage (F/V) converter 70 for converting the digital rate signal produced by the rate generator 40 into an analog signal representative of the digital pulse rate, and a voltage comparator 72 for comparing the analog rate signal with a plurality of preset reference voltages V (ref 1) to V (ref n) representative of the previously derived resonant frequencies or frequency limits. A suitable comparator 72 is that known as a "window" comparator capable of producing an indication whenever an input signal falls within a "window" defined by a pair of preset upper and lower limits. Whenever the signal produced by the (F/V) converter 70 matches a signal or "window" of signals set in the comparator 72, a SET signal is generated on data line A to introduce the proper amount of attenuation into the drive signal being applied to the motor. If no match is found, no SET signal is generated. As before, several levels of drive signal attenuation may be provided for selection. The parts of the scheme of FIG. 1 performed by the above-described analog circuit include the search 24, the analysis 26 of the search, and the setting 28 and clearing 30 of the drive level. Certain control capability is still required to calculate 22 the drive frequency, enable 32 the motor control circuit, monitor 34, 36 its operation, and disable 37 the circuit when the motor rotor 62 has reached a desired position.

Although the motor control system of the present invention has been described herein primarily in terms of a stepping motor and an incremental plotter it is understood that the system is applicable as well to the precise and accurate control of the general class of synchronous motors in a variety of environments.

The terms and expressions which have been employed in the foregoing specification are used therein as terms of description and limitation, and there is no intention, in the use of such terms and expressions, of excluding equivalents of the features shown and described or portions thereof, it being recognized that the scope of the invention is defined and limited only by the claims which follow.

I claim as my invention:

1. Motor control means within a motor drive system for minimizing fluctuations in the angular velocity of the rotor element of a synchronous motor operated in the slewing mode, said means comprising:
    (a) means for storing a signal representative of a drive frequency at which the angular velocity of said rotor element is known to fluctuate resonantely when operated in a continuous unidirectional mode;
    (b) means for receiving a signal representative of a drive frequency at which it is desired to operate said motor;
    (c) means associated with said storing means and said receiving means for comparing said desired frequency signal with said resonant frequency signal;
    (d) means for producing a motor drive signal having a frequency proportional to the frequency represented by said desired frequency signal; and
    (e) means responsive to said comparison of said desired frequency signal and said resonant frequency signal for applying said drive signal to said motor at a first preselected amplitude if said signals are not equal and at a second preselected amplitude if said signals are equal.

2. The motor control means of claim 1 wherein said signal storing means (a) includes means for storing a plurality of such resonant frequency signals, wherein said comparison means (c) includes means for comparing said desired frequency signal with each of said stored resonant frequency signals, and wherein said signal applying means (e) includes means for applying said drive signal to said motor at a second amplitude if said desired frequency signal is equal to any of said resonant frequency signals.

3. The motor control means of claim 1 wherein said signal storing means (a) includes means for storing two frequency signals representative respectively of the upper and lower limits of a predefined band of frequencies centered about and including said resonant frequency, wherein said comparison means (c) includes means for comparing said desired frequency signal with each of said upper and lower limit frequency signals, and wherein said signal applying means (e) includes means for applying said drive signal to said motor at said second amplitude if the frequency represented by said desired frequency signal is included within the frequency band defined by said limit frequency signals.

4. The motor control means of claim 1, 2, or 3 wherein said second amplitude of said drive signal is less than said first amplitude.

5. The motor control means of claims 1, 2, or 3 wherein said second amplitude of said drive signal is greater than said first amplitude.

6. The motor control means of claim 1 wherein said resonant frequency signal and said desired frequency signal are digital.

7. The motor control means of claim 6 wherein said signal storing means (a) includes a digital memory device for storing said digital resonant frequency signal and wherein said comparison means (c) includes a digital processor in communication with said memory device.

8. The motor control means of claim 1 wherein said resonant frequency signal and said desired frequency signal are in analog form.

9. The motor control means of claim 8 wherein said signal storing means (a) includes means for producing a preselected analog reference signal representative of said resonant frequency and wherein said comparison means (c) includes an analog signal comparator for comparing the magnitude of said desired frequency signal with the magnitude of said resonant frequency reference signal.

10. A method of minimizing fluctuations in the angular velocity of the rotor element of a synchronous motor operated in the slewing mode, said method comprising the steps of:
(a) providing a signal representative of a motor drive frequency at which the angular velocity of said rotor element is known to fluctuate resonantely when operated in a continuous unidirectional mode;
(b) receiving a signal representative of a drive frequency at which it is desired to operate said motor;
(c) producing a motor drive signal having a frequency proportional to the frequency represented by said desired frequency signal;
(d) comparing said desired frequency signal with said resonant frequency signal; and
(e) responsive to said comparison of said desired frequency signal and said resonant frequency signal, applying said drive signal to said motor at a first preselected amplitude if said signals are not equal and at a second preselected amplitude if said signals are equal.

11. The method of claim 10 wherein said step (a) includes providing a plurality of such resonant frequency signals, wherein said step (d) includes comparing said desired frequency signal with each of said provided resonant frequency signals, and wherein said step (e) includes applying said drive signal to said motor at said second amplitude if said desired frequency signal is equal to any of said resonant frequency signals.

12. The method of claim 10 wherein said step (a) includes storing two frequency signals representative respectively of the upper and lower limits of a predefined band of frequencies centered about and including said resonant frequency, wherein said step (d) includes comparing said desired frequency signal with each of said upper and lower frequency signals, and wherein said step (e) includes applying said drive signal to said motor at said second amplitude if the frequency represented by said desired frequency signal is included within the frequency band defined by said limit frequency signals.

13. The method of claims 10, 11, or 12 wherein said second amplitude of said drive signal is less than said first amplitude.

14. The method of claims 10, 11, or 12 wherein said second amplitude of said drive signal is greater than said first amplitude.

* * * * *